United States Patent [19]

Maruyama

[11] Patent Number: 5,959,859
[45] Date of Patent: Sep. 28, 1999

[54] PLANT MONITORING/CONTROLLING APPARATUS

[75] Inventor: Takekazu Maruyama, Mito, Japan

[73] Assignee: Hitachi, Ltd., Tokyo, Japan

[21] Appl. No.: 08/844,352

[22] Filed: Apr. 18, 1997

[30] Foreign Application Priority Data

Apr. 25, 1996 [JP] Japan ................... 8-104922

[51] Int. Cl.⁶ .................................................. G05B 15/00
[52] U.S. Cl. ...................... 364/131; 364/470.14
[58] Field of Search .................. 364/131, 470.14, 364/400, 410.1, 468.15, 468.16, 475.09, 551.01; 340/852.52; 702/188

[56] References Cited

U.S. PATENT DOCUMENTS 4,607,256  8/1986  Henzel ........................ 340/825.52
5,432,715  7/1995  Shigematsu ................... 364/551.01

FOREIGN PATENT DOCUMENTS 7230430  8/1995  Japan .

*Primary Examiner*—William Grant
*Assistant Examiner*—Chad Rapp
*Attorney, Agent, or Firm*—Kenyon & Kenyon

[57] ABSTRACT

In a distributed type plant monitoring/controlling apparatus, data required to be synchronized with each other in a system can be synchronized with each other, and a system with high reliability and a high performance is provided. In a plant monitoring/controlling apparatus in which a plurality of clients communicated with each other via a network are arranged, the plant monitoring/controlling apparatus is equipped with one client functioning as an original client with respect to each of functions, the original client corresponding to a software server for each of the functions used to monitor and control the plant; an original client of a first function transmits data related to the first function to another client; and the another client receives the data transmitted from the first function original client to store the received data into a storage unit provided with the another client, whereby the data stored in each of other clients are synchronized.

2 Claims, 9 Drawing Sheets

FIG. 3

| FUNCTION | LOAD (%) | ORIGINAL CLIENT SUBJECT 1 | ORIGINAL CLIENT SUBJECT 2 | ORIGINAL CLIENT SUBJECT 3 |
|---|---|---|---|---|
| ALARM MONITOR | 20 | CLIENT 1 | CLIENT 2 | CLIENT 3 |
| TREND DATA ACQUISITION | 35 | CLIENT 2 | CLIENT 3 | CLIENT 1 |
| LOG DATA ACQUISITION | 15 | CLIENT 3 | CLIENT 1 | CLIENT 2 |
| DATA INSERTION | 5 | CLIENT 3 | CLIENT 1 | CLIENT 3 |

FIG. 9
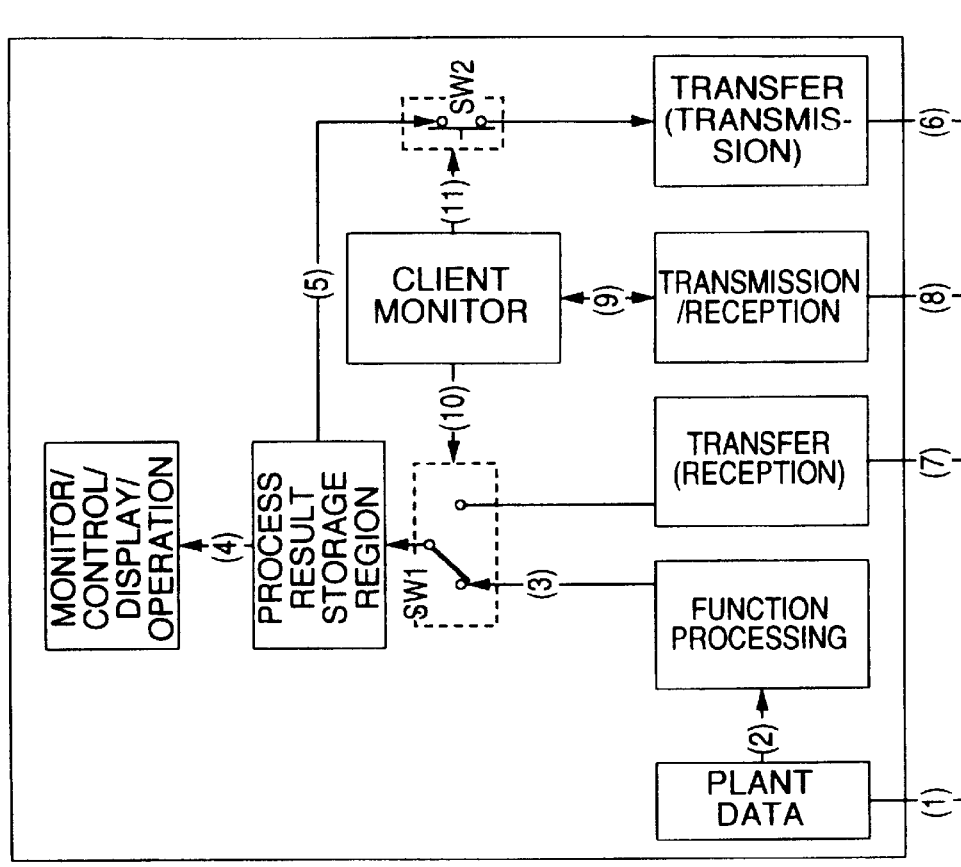
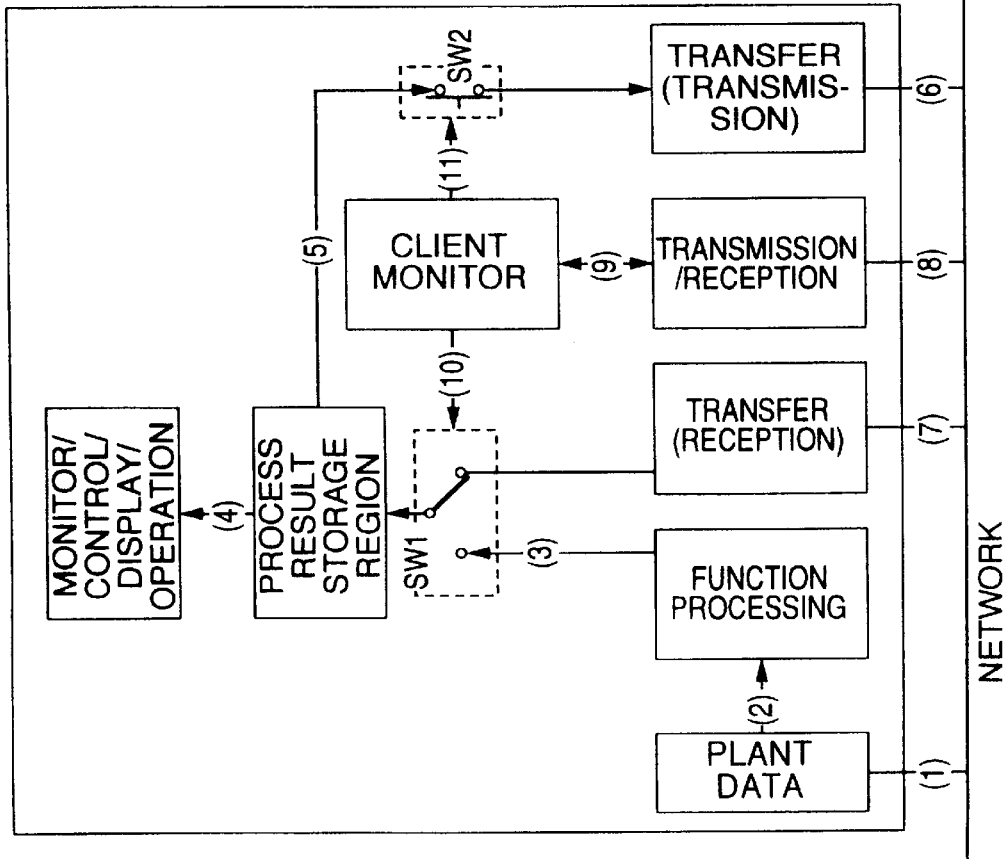

PLANT MONITORING/CONTROLLING APPARATUS

BACKGROUND OF THE INVENTION (a). Field of the Invention

The present invention is related to a plant monitoring/controlling apparatus for monitoring/controlling a subject plant, for instance, a thermal power plant or a nuclear power plant, in particular, a system in which a plurality of terminal units are arranged via a network.

(b). Description of the Related Art

Conventionally, in order to improve reliability of a plant monitoring/controlling apparatus with employment of a powerful computer capable of managing programs and data in a batch mode, a distributed type system has been proposed in which the overall function of this plant monitoring/controlling apparatus is subdivided into several sub-divided functions. Then, each of these sub-divided functions is executed by a plurality of small-scaled computers, and, thus, all of the required functions can be realized. JP-A-7-230430 laid open in 1995 describes such a conventional system in which, when the information is transmitted/received among these computers distributed in this system, the information can be transmitted without paying any attention to the operation conditions of the counter party.

However, the above-described related art clearly describes the transmission/reception of the information, but never discloses synchronizations of information among computers capable of processing such information which should be synchronized.

In plant monitoring/controlling apparatus employing distributed type systems, information which is required to be synchronized must be shared among a plurality of terminal units.

SUMMARY OF THE INVENTION (a). Objects of the Invention

Therefore, an object of the present invention is to provide such a system operable under higher stable conditions and capable of synchronizing information, programs, and data, which are required to be synchronized, in a plant monitoring/controlling apparatus employing a distributed type system.

(b). Statements of the Invention

A plant monitoring/controlling apparatus, according to the present invention, has the feature that, in a plant where a plurality of clients are arranged and communicate with each other via a network, one client functioning as an original client equal to a software server for each of a number functions used to monitor/control the plant is assigned to each of the functions; an original client of a first function transmits data related to the first function to another client; another client receives the data transmitted from the first original client to thereby store this received data into a storage unit employed in the other client; and data stored in the respective other clients are synchronized.

Then, in accordance with the plant monitoring/controlling apparatus of the present invention, when the information synchronization is required in the system, the information can be synchronized. Also, reliability and performance of the system can be improved.

BRIEF DESCRIPTION OF THE DRAWINGS

For a better understanding of the present invention, reference is made of a detailed description to be read in conjunction with the accompanying drawings, in which:

FIG. 3 schematically represents a client transmission/reception processing diagram;

FIG. 9 is an explanatory diagram for explaining another system configuration/control of the client.

DETAILED DESCRIPTION

Figure 1:
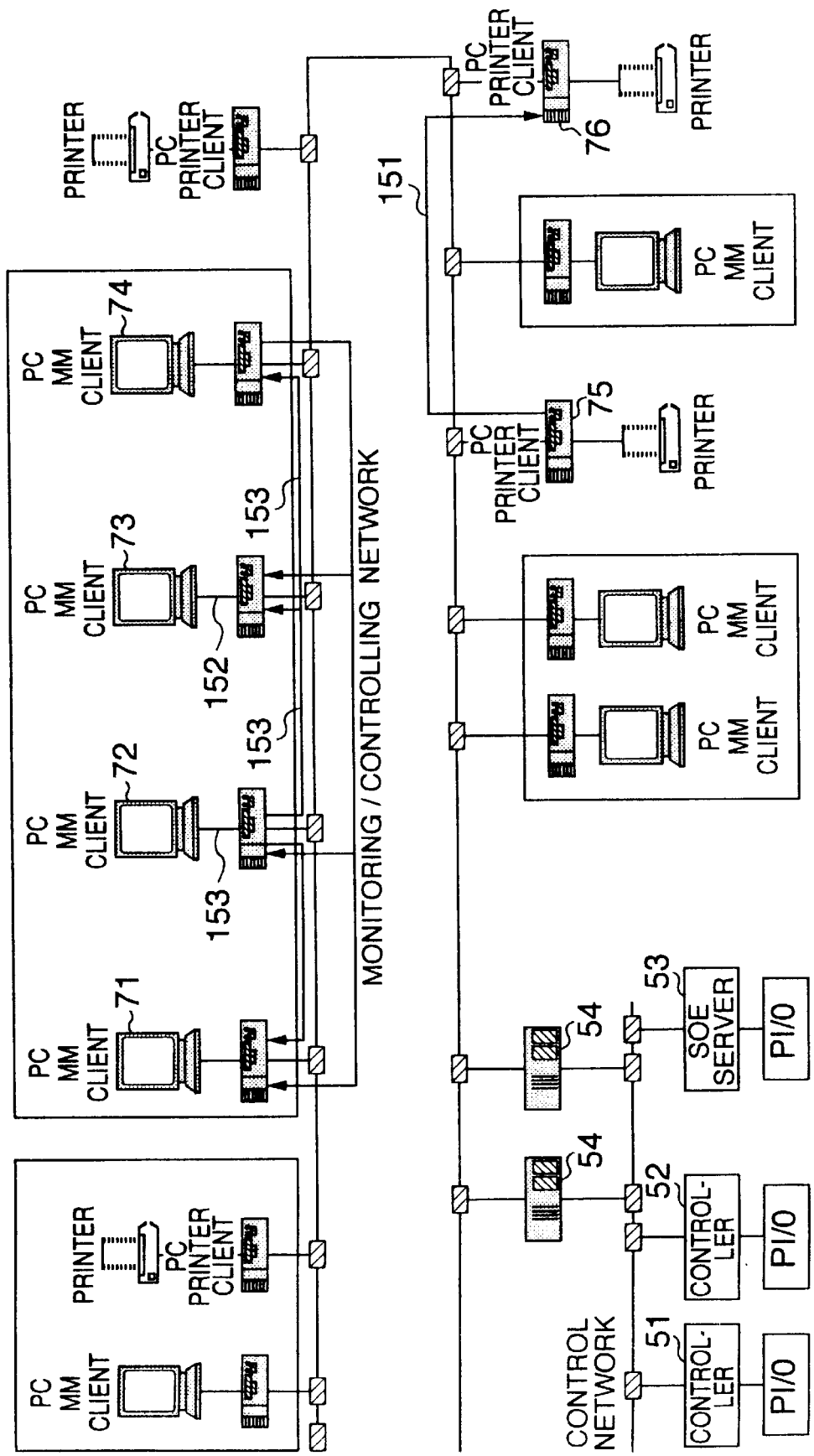
FIG. 1 is a schematic diagram representing an overall structure of a plant monitoring/controlling apparatus according to an embodiment of the present invention.

A feature of the present invention is to improve data synchronizing operations in a plant monitoring/controlling apparatus. That is, in a plant where a plurality of clients are connected and communicate with each other via a network, with one client, functioning as an original client equal to a software server for each of functions used to monitor/control this plant being provided for each of the functions; an original client of a first function transmits data related to the first function to another client; another client receives the data transmitted from the first original client to thereby store this received data into a storage unit employed in another client; and data stored in the respective other clients are synchronized.

Also, data corresponding to a first function among the respective functions used to monitor/control a plant is acquired from a network; and after a process operation for calculating first process sync (synchronous) data is executed, this first process sync (synchronous) data is stored, and a first client for transmitting this first process sync (synchronous) data via the network to another client is present. Then, data corresponding to a second function among the functions used to monitor/control the plant is acquired from the network to thereby be processed; and after a process operation for calculating second process sync (synchronous) data is executed, this second process sync (synchronous) data is stored, and a second client for transmitting the second process sync (synchronous) data via the network to another client is present.

Also, each of the clients acquires the data from the network, processes the sync (synchronous) data corresponding to their respective designated functions among the functions used to monitor/control the plant, calculates the process sync (synchronous) data, stores this process sync (synchronous) data, and transmits this process sync (synchronous) data via the network to another client. Each of the above-explained functions is designated with respect to each of the clients by one predetermined configuration control client.

When the designation is made, the above-described configuration control client designates the clients capable of handling the respective functions based upon the detection results of the processed load conditions by each of other clients in such a manner that a function with a light load is shared in a client which processes a heavy load, whereas a function with a heavy load is shared in a client which processes a light load. As a result, the loads on the computers can be balanced.

Also, the configuration control client monitors the second conditions of other clients, and issues an instruction to a second client so as to execute a first function process when it is rather difficult to execute a first function process with a first designated client. As a consequence, even when a failure happens to occur, it is possible to suppress a loss of a function, so that the plant is operable under stable condition.

For instance, in the case that the data transmission is interrupted in the network, a second configuration control client is newly determined within a second network in which the communication between the above-described configuration control client and this second network is interrupted. Then, this second configuration control client designates the functions with respect to each of the clients to other clients located in the second network in such a manner that the functions shared by the respective clients present in the network before the interruption are shared by the clients existing in the first network.

At this time, in the first network communicating with the above-described configuration control client, the configuration control client designates the functions with respect to the respective clients to other clients present in the first network in such a manner that the functions which have been shared by the respective clients involved in the network before the interruption are shared by the clients existing in the first network.

In accordance with the present invention, since the subdivision of the functions in the overall system is performed based upon, for example, a so-called "individual function level distribution", the reliability of this entire system can be improved, as compared with the conventional distribution of the computer at functional levels.

As a consequence, to improve the function of the overall system, similar functions to those of the prior art can be maintained by the general-purpose computers having the relatively low performances irrelevant to the performances of the respective computers communicated with the network. Also, in the case that the computer having a similar performance to that of such a computer used in the function level distribution of the computer is used, it is possible to provide a plant monitoring/controlling apparatus with a high performance.

Also, according to the present invention, even when a server as a separate hardware element is not provided, the overall system can be constructed with a so called "server function" owned in a level of a software, and the performance of the system can be further increased.

For instance, even when a terminal (client) whose processing performance is low is employed, it is possible to provide a low-cost system from which a separate server constructed as a hardware is eliminated, so that the high reliability can be realized, and the sync (synchronous) data can be managed in a background mode.

Concretely speaking, even when such a terminal having a low processing function is employed, a plurality of processing functions are distributed/arranged among a plurality of process terminals, so that the economical profit can be improved while maintaining the performance.

Also, even when the hardware server is eliminated, the overall system can be maintained. Since the data are managed in the batch mode, the server functions are owned on a functional basis, and the data can be processed in a cooperative manner with other terminals.

Further, in order to increase the reliability of the system, each server function, in unit of the function, may be backed up with another unit of the terminal.

In FIG. 1, there is shown an overall configuration of a plant monitoring/controlling apparatus according to an embodiment of the present invention.

Process data sent from a plant is acquired by various sorts of controllers 51, 52, and a process input/output apparatus (PI/0) or an SOE server (highspeed contact acquiring apparatus) 53, and then is acquired via a control network by a gateway 54. The process data acquired by the gateway 54 is periodically transferred to a monitoring/controlling network. In each of a plurality of CRT terminals, the process data which is periodically sent is periodically acquired so as to be monitored and controlled. In this case, when the plant monitoring/controlling operation is carried out, the monitoring/controlling information at the respective CRT terminals may be subdivided into information (non-synchronous data) which does not cause a problem even when the monitoring/controlling information is not identical in each terminal, and information (synchronous data) which causes a problem unless the monitoring/controlling information is identical in each terminal. For example, as the non-synchronous data, there are a list representation in which present conditions of a plant are periodically displayed, and a schematic diagram representation in which operation conditions of a plant are graphically displayed in connection with present values. As the synchronous data, there are an alarm display for displaying an occurrence of a failure in a plant together with a time of occurrence, a function for displaying past process conditions in a trend form, and a data insertion function in which data set in a certain CRT terminal is set to the same data at the respective CRT terminals.

As to process operations executed in each of the CRT terminals which handle the non-synchronous data, the display process operation is independently carried out in each of the CRT terminals, and there is no need to monitor/control the operating conditions (life/death) of other CRT display terminals. As a consequence, the same monitoring/controlling functions are installed in the respective CRT terminals, so that the process operations can be realized. As to process operations executed in each of the CRT terminals, conventionally, in the prior art, all of the data are processed in the batch mode and managed by a single server, and the data are distributed from this single server to the respective CRT display terminals (clients). In accordance with this embodiment of the present invention, contrary to the conventional server, a server is implemented by subdividing functions used to handle the synchronous data such as to be distributedly arranged/controlled in each of the clients, so that a monitoring/controlling system can be realized.

Each of clients (for example, clients 71 to 75 etc.) communicating with the monitoring/controlling network may take a function to become various sorts of original clients. For instance, the client 72 takes a function as an original man/machine clients, and the client 73 takes a function as an original automation client. The present value data processing operation is carried out in each of the clients. Also, as to the trend data acquisition among the historical data process operations, the trend data is acquired in the respective clients. During the initiation, the trend data can be down-loaded from the original man/machine client 72.

For instance, the client 75 takes a function as an original print client to execute a logging process operation and a calculation process operation (time sequential calculation), and transmits log data 151 via the network to another client 76 and the like in order to synchronize the data.

Also, when data 152 is inserted from the client 73 of the original automation client via the network to the client 72 of the original man/machine client, alarm message data 153 is inserted via the network into another client 71, the client 73, and the client 74 so as to combine the data. This alarm message data 153 corresponds to such data which has been processed based on the function taken by this client 72.

The data processed by the client 74 while the CRT operation is executed is transmitted to other clients 71 to 73.

Figure 2:
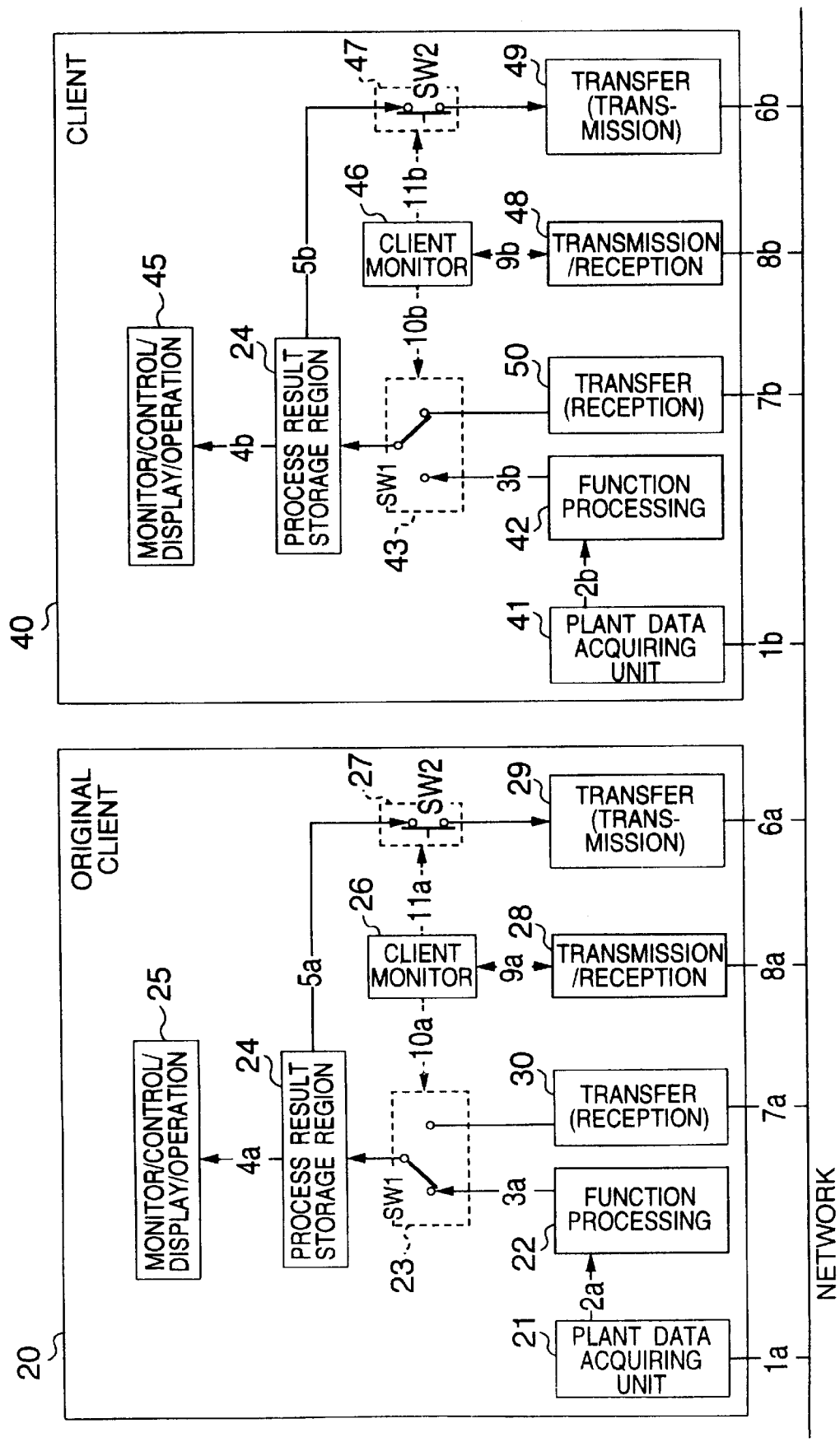
FIG. 2 schematically shows a data server/client diagram on a functional basis.

In FIG. 2, the clients in FIG. 1 are represented in detail (data server/client in unit of function).

One of clients which play an original client corresponding to a software server with respect to each of functions used to monitor/control a plant is equipped with a plant monitoring/controlling apparatus for such a plant that a plurality of clients communicated with each other via a network are arranged, with respect to each of the functions. There are the respective clients which take an original client 20 and a client 40 as to one function. Each of these clients is equipped with a configuration essentially similar to that of these clients.

In summary, the client 20 of the first function has a plant data acquiring unit 21 for acquiring data from the network. A transfer (receiving) unit 30 may be used as a unit for acquiring other process data.

The client 20 of the first function has a function processing unit 22 for executing a process operation of data corresponding to the first function, among this acquired data, and executes a function process operation as the original client with respect to the allocated function. This first function original client 20 is further comprised of a process result storage region 24 for storing either the synchronous data among the acquired data or the first process data obtained from this processing unit 22; and a transfer (transmitting) unit 29 for transmitting the data stored in this storage region 24 via the network to another client; and also a client monitoring/processing unit 26 for controlling such that the first process data obtained from the processing unit is stored into a storage unit, and also is transmitted from the transmitting unit, and then other synchronous data are stored into the storage unit. As a result, this first function original client 20 can instruct as to whether or not the function process operation of the input data is carried out, and can instruct as to whether or not the data is transmitted.

Also, this first function client is equipped with a transmission/reception processing unit 28 for transmitting, or receiving such a signal used to determine which function process operation is taken up by this client monitoring/ processing unit 26 by communicating with other clients.

It should be noted that a client of a second function may own a similar configuration to the above-described first function client.

Such a case that the function required for the synchronization process must be realized in each of the CRT terminals will now be described, while the terminal for managing the data in unit of the function is subdivided into an original client and a client for monitoring/displaying data with reference to data-managed data.

PROCESS OPERATIONS OF ORIGINAL CLIENT 20

(i) A plant data process operation by the original client 20 is initiated when the original client 20 first acquires the plant data from the network via a path 1a into the plant data acquiring unit 21.

(ii) The acquired plant data is sent to the function processing unit 22, and then is function-processed via another path 2a in the function processing unit 22 allocated as the original client. The process data is transferred via another path 3a (SW1) 23 to the process result storing unit 24. Such a condition as to whether the plant data is processed to be stored, or the plant data is stored from the transfer (reception) unit 30 may be determined based upon a control instruction 10 of the original client issued from the client monitoring/processing unit 26 to the path (SW1) 23. As to the client monitoring/processing unit 26, it is determined as to which client becomes the original client with respect to any one of the function processes from the transmission/reception processing unit 28 via the path 9 via the network by the path 8 and by the path 8b and the path 9b, the transmission/reception processing unit 48 of another client. A detailed description thereof will be made by reference to FIG. 3.

(iii) Each of monitor/control/display/operation processing units 25 acquires the process result stored in the process result storage region 24 via a path 4a, and then processes the acquired process result.

(iv) On the other hand, the process result stored in the process result storage region 24 is sent via the original client (5a) to a switch (SW2) 27. In this case, the switch (SW2) 27 which has been turned ON/OFF in response to the control instruction 11 by the client monitoring/processing unit 26 is turned ON in order to transmit the process data. As a consequence, the process result is transmitted through the switch (SW2) 27, or from the path 6a via a transfer (transmission) unit 26 to the other client 40. As a result, the process data can be synchronized.

PROCESS OPERATION OF CLIENT (i) The process result processed by the original client 20 is transferred through the network via a path 7b from the transfer (reception) unit 50 by the switch (SW1) 43 to be stored in the process result storage region 44 of the client 40. The switch (SW1) 43 is switched through a path 10 in response to the control instruction issued from the client monitoring/processing unit 46, so that the process data is acquired. The side of the client 40 is connected to the side of the transfer (reception) processing unit 50. The operation of the client monitoring/processing unit 46 is determined from the transmission/reception processing unit 48 through the path 9a via the path 8a by the transmission/reception process (path 8b and path 9b) of another client. A detailed operation thereof will be explained with reference to FIG. 3.

(ii) Each of the monitor/control/display/operation processing units 45 acquires the process result stored in the process result storage region 44 through the path 4b so as to process the acquired process result.

(iii) On the other hand, the process result stored in the process result storage region 44 is sent via the path 5b to the switch (SW2) 47. In this case, the switch (SW2) 47 which has been turned ON/OFF in response to the control instruction 11 issued from the client monitoring/processing unit 46 is turned OFF, since the process result is not the process data. As a consequence, this information is not transferred via the switch (SW2) to other clients.

For instance, in such a case that as to a predetermined function, this function is processed as the original client, the process data is transmitted to another client so as to synchronize the data. This data is received and stored by the other client, but is not transmitted to other clients.

As described above, as to the process result which has been acquired/managed by the original client in unit of a single function, it is so set that the data is transmitted to another client in response to the instruction of the client monitoring/processing unit, and then the data is transferred via the network to other clients, so that the data can be combined with each other.

Figure 4:
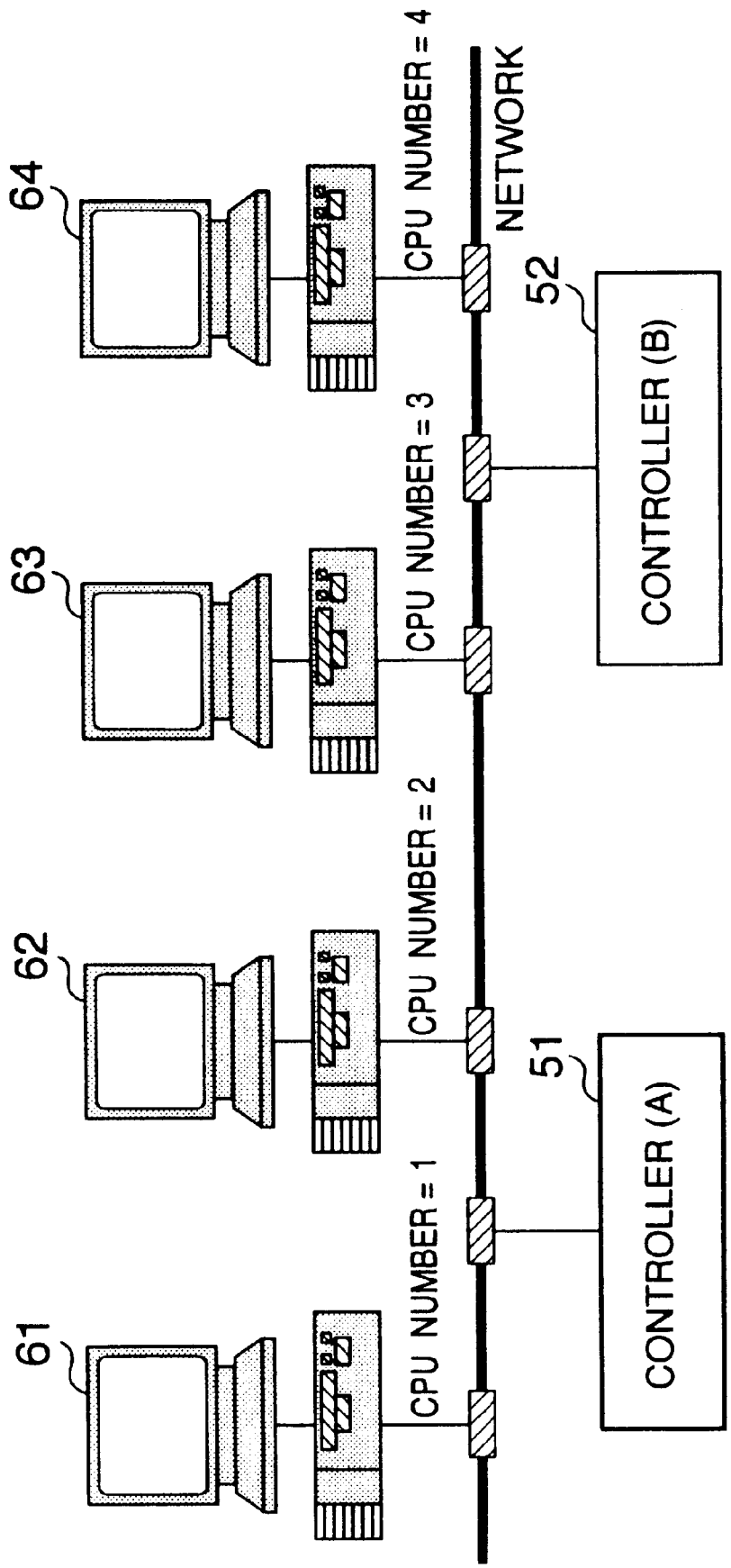
FIG. 4 is an explanatory diagram for explaining the client.

Referring now to FIG. 3 and FIG. 4, the monitoring process operation of the client shown in FIG. 1 will be described.

FIG. 4 is an explanatory diagram for explaining the monitoring process of the client. Process data are acquired from a controller (A) and a controller (B), which execute acquisition/control operations of the process data to a network. A client 61 having a CPU number 1 constitutes an original configuration client, and other clients (61, 62, 63, 64) whose CPU number is larger than the CPU number 1 of this client 61 communicate with each other via the network. Now the monitoring process operation of the client will be described.

(1) Each of the clients takes CPU numbers by interrogating other clients in the sequence of the initiated clients. For example, the respective clients interrogate the empty conditions of the CPUs, and which load functions are taken.

(2) Among these clients, such a client whose CPU number is the smallest number becomes an original configuration control client for judging/determining the configuration of the overall system. With respect to each of the functions, such an allocation is made as to whether or not the client having any of the CPU numbers is set to each of the original clients.

(3) Based upon function sort management information (configuration control management information) for requiring synchronous data (shown as one example of FIG. 3), the original configuration control client issues each of original client instructions as to the function process for each of the clients. FIG. 3 represents one example when the functions described in the drawing are shared to the respective clients.

This indicates an example of allocations to the three clients (1 to 3) with respect to the functions for requiring the synchronous data shown in FIG. 3. As to the alarm monitoring function, the client 1 is allocated as a subject 1. In the case that the system is not yet initiated, the system is stopped, or a failure happens to occur and therefore the system operation becomes difficult, the client 2 and thereafter the client 3 are set as the original client subjects. Similarly, as to other functions, the allocation is made in such a manner that the load of the function taken by each of the clients becomes equal.

Since the functions can be properly allocated to the clients by the configuration control client, the expanding characteristic of the system can be maintained under better condition.

Alternatively, the functions are subdivided, and then the subdivided functions may be executed by cooperation of the respective clients.

In the case that the control operation is carried out by continuously monitoring the conditions of the plant, even when a portion of the network is interrupted, the plant may be maintained without deteriorating the entire functions in each of the interrupted network systems.

Also, while a communication signal is periodically issued among the respective clients, when a judgement is made that a failure happens to occur, the function of the client containing the failure may be changed in accordance with, for example, the subject order of FIG. 3 so as to be taken up by another client. At this time, the function sort original clients are determined in response to the CPU loads reported from the respective clients. In response to the various sorts of functions, an ensuing allocation of which original client is made is allocated to which client. While judging the loads reported from the respective CPUs, the allocation is made as follows. That is, a client in which a load of a CPU is light becomes an original client for a heavy load function.

It should be understood that since the original configuration control client will monitor the life/death conditions of the respective clients, the CPU loads and the original client functions are periodically reported from the respective clients to the original configuration control client. Then, upon receipt of this report, the original configuration control client transfers the function sort management information (configuration control management information) for implying that the original configuration control client is healthy.

(4) The original configuration control client sends this configuration control management information to the respective clients in order that the quick process operation is available when the network is required to be reconstructed when the failure happens to occur in the original configuration control client.

Since this configuration is fixed, when each of the original clients (except for original configuration control client) is stopped, the original configuration control client issues such an instruction that the function taken by the original client which has stopped due to the occurrence of such a failure is shared by the clients operated under normal condition in order to equalize the CPU loads given to the respective clients in accordance with the configuration control management information and the loads given to the respective CPUs. The function process operation taken by the stopped original client is shared by the remaining clients. At this time, the function allocation is carried out in a manner similar to the above-described manner, depending upon spare capacity in the CPU loads of the clients.

In accordance with this embodiment, reliability of the plant can be increased. In addition, the performance and the economical aspect of the plant can be improved.

While considering the process performance, the data can be managed in the batch mode, and the distributed process operation is performed, so that the function process operations can be carried out in a parallel manner. As a consequence, the overall performance can be improved, for instance, a speed improvement can be realized.

Even when a predetermined process operation is performed with respect to the data processed by other clients, since it is possible to avoid producing a difference in the data which should be synchronized with each other, a function process operation suitable to monitor the system can be carried out.

A client may judge as to whether or not the data among the data transmitted to a computer (client) in an on-line system corresponds to an allocated function. Then, if the data corresponds to this allocated function, this function process operation is carried out. As a consequence, a server implemented as hardware can be eliminated from the system.

Figure 5:
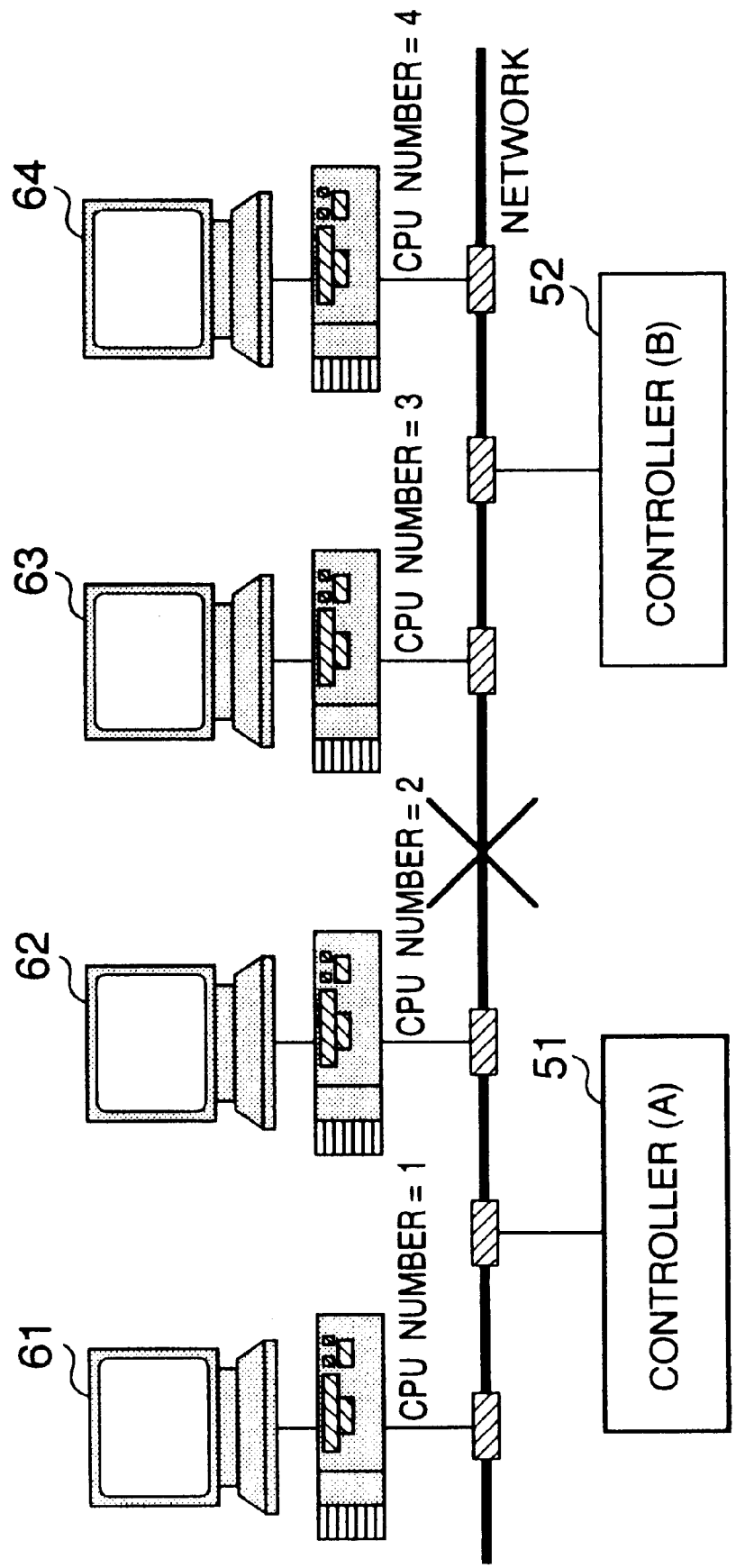
FIG. 5 is an explanatory diagram for explaining the client after the network is cut out.

FIG. 5 is an explanatory diagram for explaining a client monitoring process operation after the network shown in FIG. 1 is interrupted. In the case that the network is interrupted, a left loop of the interrupted network is backed up by executing the above-described configuration control process operation. As to a right loop of the interrupted network, no function sort management information (configuration control management information) is reported from the original configuration control client monitored by the respective clients. As previously described, as to clients, a client 63 whose CPU number is the smallest number becomes an original configuration control client for judging/ determining the configuration of the entire system related to the right loop. As previously described, the client 63 which newly constitutes the original configuration client allocates the original clients as to the respective functions to another client 64 located in such a range that the interrupted signal can be communicated. As a consequence, even when the network is interrupted, the plant can be monitored/ controlled, while maintaining the various sorts of presently available functions.

FIG. 6 to FIG. 9 indicate explanatory diagrams for explaining system configuration control operations of the clients shown in FIG. 1. Concretely speaking, these drawings represent the system configuration control operations in such a case that an original client is brought into a failure, and thereafter is recovered from this failure.

Figure 6:
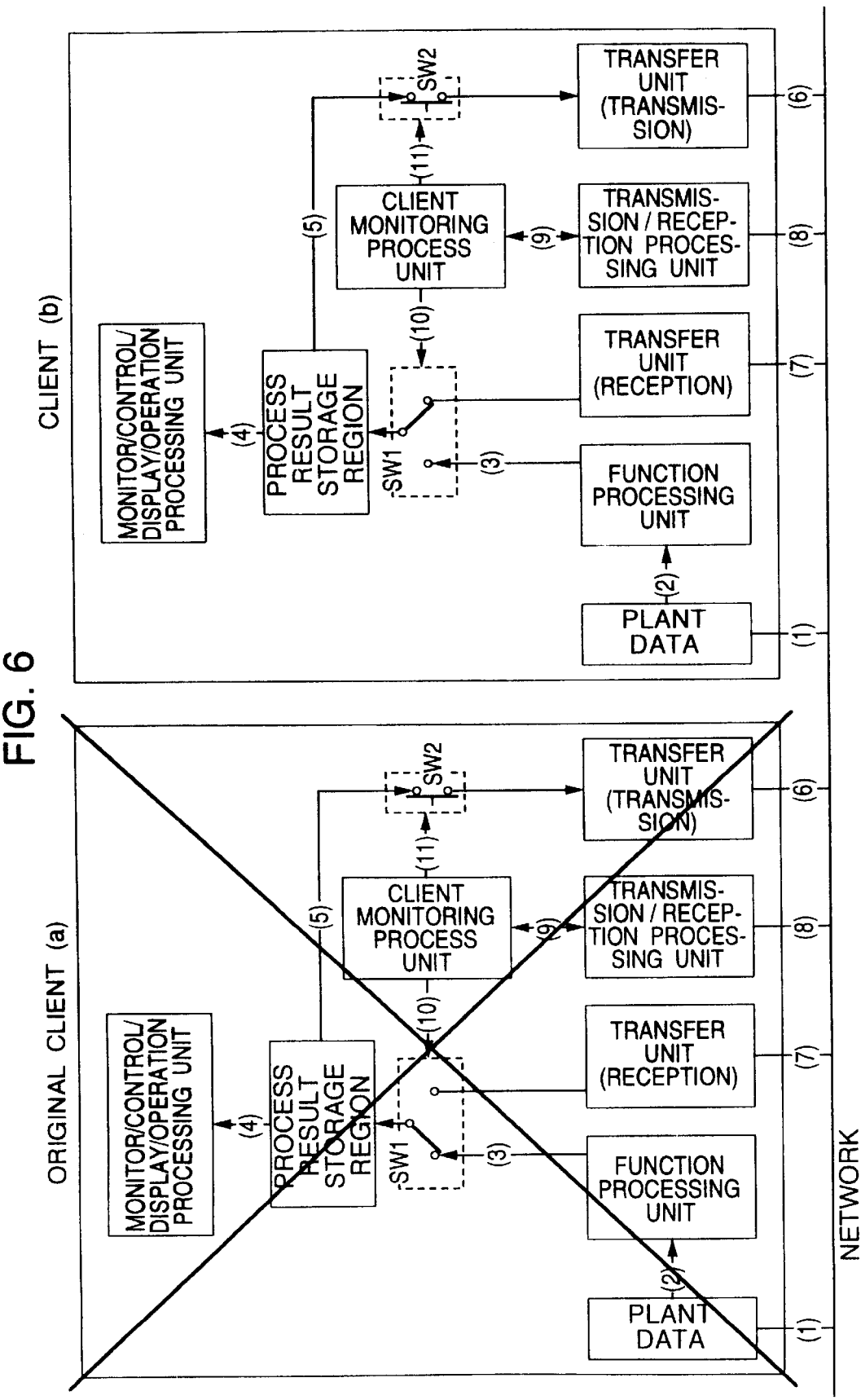
FIG. 6 is an explanatory diagram for explaining a system configuration/control of the client.

In FIG. 6, a client (a) corresponding to an original client as to a certain function is determined as the previously mentioned original configuration control client (not shown) when a failure happens to occur. Then, with respect to the function of the original client (a), such an instruction that the client (a) becomes the original client is issued from this original configuration control client. Upon receipt of this instruction, a client monitoring process unit (11) of a client (b) backs up that the client (b) will newly become the original client based upon this instruction, and the system is backed up.

Figure 7:
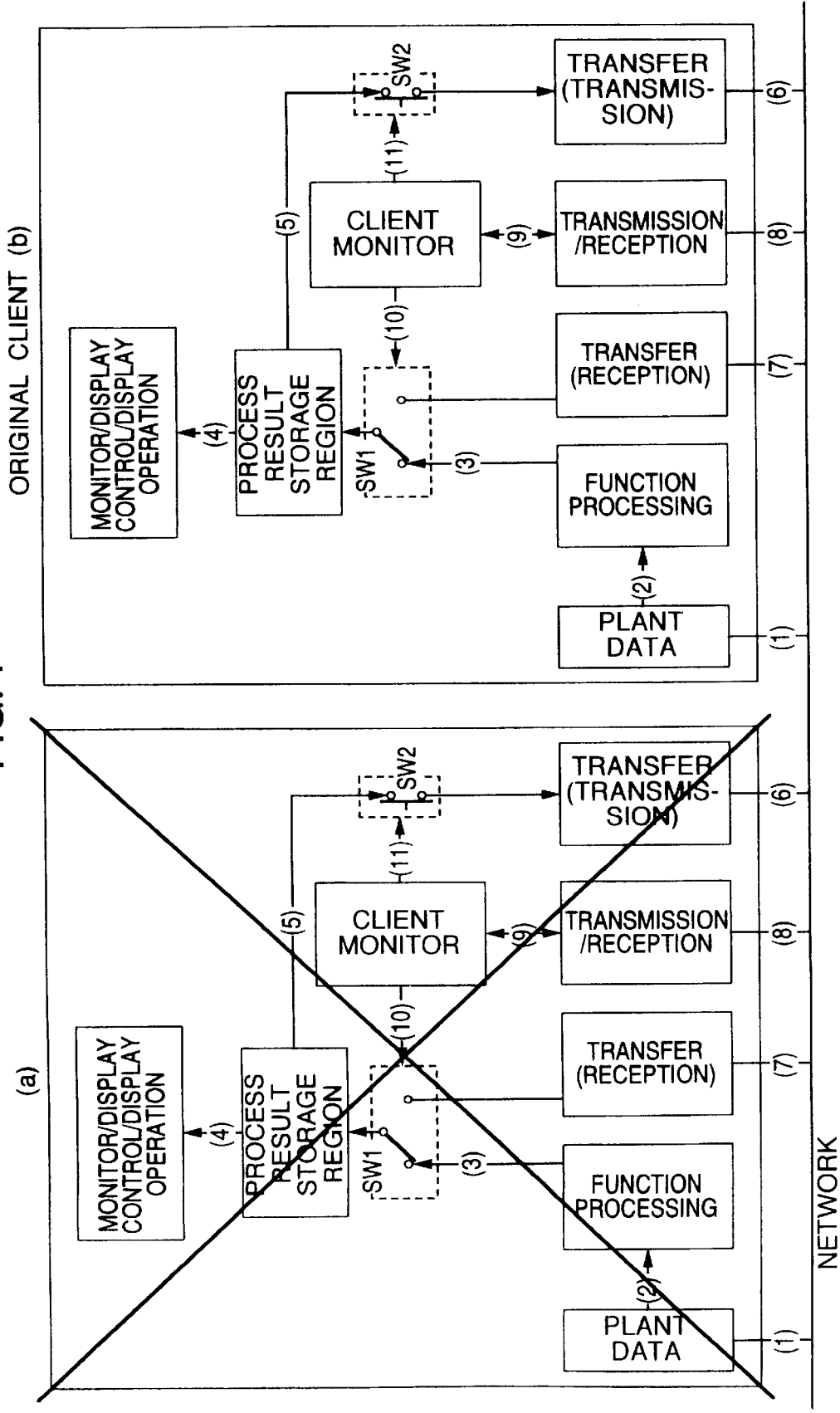
FIG. 7 is an explanatory diagram for explaining a system configuration/control of the client.

In FIG. 7, in response to this timing, a client monitoring process unit 11 of a client (b) causes a switch SW1 to be switched to the function processing side by this client (b) in order to be capable of processing information related to a function of an original client which it newly becomes. Also, this client monitoring process unit 11 causes another switch SW2 to be turned ON, so that information stored in this process result storage region can be transmitted to another client.

Figure 8:
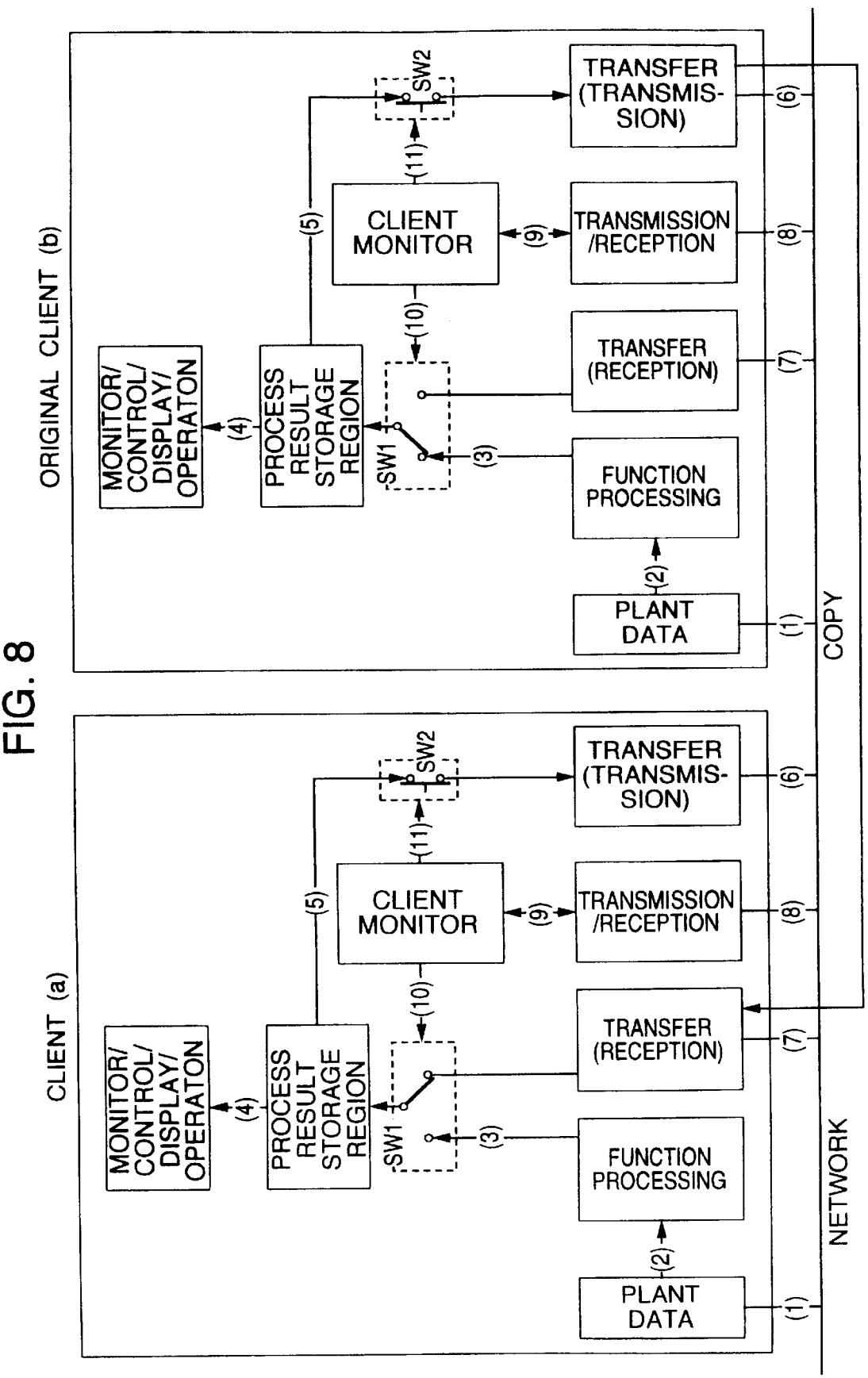
FIG. 8 is an explanatory diagram for explaining another system configuration/control of the client.

Next, in FIG. 8, when the failure occurred in the client (a) corresponding to the last original client is repaired and therefore this original client is recovered as a client (it will be referred to as a "recovered client (a)" hereinafter). The recovered client (a) makes the data of the recovered client (a)/process result storage region (24*a*) coincident with respect to the client (b) corresponding to the present original client via such a path, i.e., a switch (SW2) 27 of a process result storage region 211 of the client (b) of the present original client, a transfer (transmission) unit 29(*b*), and a transfer (reception) unit 30 of the recovered client (a), and also a switch (SW1) 23. The client (b) issues a request to transfer all of data stored in a process result storage region 24.

In FIG. 9, after the above-described data are made coincident with each other, only the information processed in the client (b) of the new original client is transferred from the client (b) of the new original client to the recovered client (a), so that the data can be subsequently synchronized.

It should be noted that the last original client may be operated as a client.

In accordance with the present invention, since a server capable of managing/monitoring the data in the batch mode is no longer required, the overall system can be arranged by employing a small number of hardware terminals.

Also, since the configurations can be distributed by the respective terminals in unit of the function, an overall system with high reliability can be constructed.

Also, since the capabilities of the respective terminals are equalized to distribute the function, it is possible to construct a system having the high performance even by employing the terminals having low processing capabilities.

As to the failure occurring in the network, since this network can be continuously monitored by the separately provided terminal group, it is also possible to construct a system having the high performance.

What is claimed is:

1. A plant monitoring/controlling apparatus in which a plurality of clients communicate with each other via a network, one client acting as an original server which is a software server for one of a plurality of functions used to monitor/control said plant said one client including:

an acquisition unit for acquiring data from said network;

a process unit for processing data corresponding to said one function from among said acquired data;

a storage unit for storing said data passed through said process unit;

a first switch connected between said process unit and said storage unit;

a reception unit connected to said first switch, for receiving synchronous data from said network;

a transmission unit for transmitting data from said storage unit to another client via said network;

a second switch connected between said storage unit and said transmission unit; and a monitoring unit connected to said first and second switches, wherein said monitoring unit controls said first and second switches in such a manner that said first switch connects said storage unit to said process unit when said one client acts as said original client, and otherwise to said reception unit, while said second switch connects said storage unit to said transmission unit when said one client acts as said original client, and otherwise disconnects said storage unit from said transmission unit.

2. A plant monitoring/controlling apparatus in which a plurality of clients communicate with each other via a network, one of said clients being a configuration control client, each of said clients including:

an acquisition unit for acquiring data from said network;

a process unit for processing, from among said acquired data, sync data corresponding to one of a plurality of functions used to monitor/control said plant so as to calculate processed sync data, said one function being assigned to said each clients by said configuration control client;

a storage unit for storing said processed sync data; and a transmission unit for transmitting said processed sync data to another client via said network, wherein when an interruption of a data transfer occurs in said network, another of said clients is newly determined as a configuration control client in a partial network in which communication with the former configuration control client is interrupted, and said another configuration control client assigns functions which were shared in said network before being interrupted to clients in said partial network on a client basis to share said functions within said partial network, while said former configuration control client assigns functions which were shared in said network before being interrupted to clients in another partial network which includes said former configuration control client, on a client basis to share said functions within said another partial network.

* * * * *